United States Patent [19]

Fenerty

[11] Patent Number: 4,641,822

[45] Date of Patent: Feb. 10, 1987

[54] WOOD HOLDER

[76] Inventor: Stanley W. Fenerty, 19 Polly Ann Ct., Dover, N.H. 03820

[21] Appl. No.: 725,298

[22] Filed: Apr. 19, 1985

[51] Int. Cl.[4] .............................................. B23Q 3/00

[52] U.S. Cl. .................................... 269/296; 269/211; 269/902

[58] Field of Search ................. 269/68, 211, 296, 309, 269/902; 211/64

[56] References Cited

U.S. PATENT DOCUMENTS

| | | | |
|---|---|---|---|
| 1,468,705 | 9/1923 | Hand et al. | 269/211 |
| 2,733,740 | 2/1956 | Little | 269/296 |
| 3,167,182 | 1/1965 | Calvin | 211/64 |
| 4,241,772 | 12/1980 | Scherer | 269/909 |
| 4,362,295 | 12/1982 | Ford | 269/901 |

*Primary Examiner*—Frederick R. Schmidt
*Assistant Examiner*—Judy J. Hartman
*Attorney, Agent, or Firm*—Harvey B. Jacobson

[57] ABSTRACT

A pair of uprights are provided and disposed in laterally spaced relation. The uprights are interconnected at their lower ends by a horizontal base projecting considerably rearwardly, only, from the uprights and each of the uprights includes front and rear standards. The front standards support a horizontal fulcrum rest extending therebetween and the rear standards support a horizontal abutment member extending therebetween and vertically ajdustable therealong. The abutment member is disposed at an elevation above the elevation of the fulcrum rest and the outwardly projecting portion of the base includes platform structure from which a considerable weight load as may be represented by large rocks may be supported. Elongated logs to be cut may have short base ends thereof engaged beneath the abutment member and over the fulcrum rest with the opposite longer free ends of the logs projecting considerably outwardly from the side of the uprights remote from the sides thereof from which the base projects. The logs may thus be supported in cantilever fashion with their free ends spaced above the ground for cutting by the operator of a power chain saw or the like.

4 Claims, 6 Drawing Figures

WOOD HOLDER

BACKGROUND OF THE INVENTION

1. Field of the Invention

This invention relates to an apparatus by which single or multiple horizontally elongated logs or lumber pieces may be supported in elevated position above a support surface in cantilever fashion with corrsponding ends of the logs or lumber pieces projecting considerably outward from one (front) side of the holder at approximately waist height to thereby enable a work person, equipped with a handheld power saw, to successively cut end sections from the outer ends of the supported logs or lumber pieces.

The holder is designed whereby a plurality of logs or lumber pieces of a length considerably greater than fireplace length may be supported with all but one set of fireplace length end sections of the supported logs or lumber pieces disposed to the front side of the support. In this manner, successive outer end pieces may be cut from the logs or lumber pieces until the logs or lumber pieces are approximately twice the length of a fireplace log. Then, a final end piece may be cut from each remaining log or lumber piece to cut the latter in half.

2. Description of Related Art

Various different forms of supports for horizontally elongated members to have work performed thereon heretofore have been provided. Examples of such supports are disclosed in U.S. Pat. Nos. 2,709,384, 3,041,064 and 4,195,828. In addition, more pertinent holders or supports specifically designed to support elongated logs or lumber pieces and which include the basic structural features of the instant invention are disclosed in U.S. Pat. Nos. 4,258,907 and 4,362,295. Each of these latter two supports is capable of supporting one or more logs in cantilever fashion, but incorporates a base structure which projects considerably to the side of the support from which log or lumber pieces are to be cut. This base structure, a pair of bottom support arms or foot portions, represent ground obstables over which work persons using the holders and equipped with a motorized chain saw or the like may trip while performing a log or lumber piece cutting operation. Accordingly, a need exists for a log or lumber piece holding apparatus of the same general type as disclosed in U.S. Pat. Nos. 4,285,907 and 4,362,295, but which is totally devoid of portions of the support extending to the side thereof from which cutting operations are to be performed.

SUMMARY OF THE INVENTION

The wood holder of the instant invention includes a pair of opposite side uprights between whose upper end portions a first horizontally elongated fulcrum rest extends and is secured. A horizontally elongated abutment member also extends between and is mounted from the upper portions of the upright at an elevation spaced above the fulcrum rest and with the abutment member disposed in a first vertical plane laterally spaced from a second vertical plane containing the fulcrum rest. Base means is provided interconnecting the lower end portions of the uprights and the base means extends considerably horizontally outwardly of the side of the first plane remote from the second plane and includes means for strongly resisting upward displacement of the outer extremity of the base means relative to a surface upon which the base means rests. The means by which the outward extending portion of the base means resists upward displacement relative to a surface upon which the base means rests comprises a platform which may be loaded with any suitable weight means such as large rocks of sufficient weight to offset the cantilever loading of elongated logs or lumber pieces from the fulcrum rest and abutment member.

The main object of this invention is to provide a wood holder for cantilever support of one or more elongated logs or lumber pieces in elevated horizontal position from a ground surface or the like and with the supported logs or lumber pieces disposed at approximately waist height.

Yet another object of this invention is to provide a portable wood holder in accordance with the preceding objects and which is devoid of any ground supported or other low portions thereof disposed to the side of the wood holder from which the supported logs or lumber pieces project and to thereby maintain the ground area on that side of the wood holder free of low obstructions over which a chain saw operator may trip while performing a log or lumber piece cutting operation.

Still another object of this invention is to provide a wood holder which may be adjusted to accommodate elongated logs or lumber pieces of various transverse dimensions.

A further object of this invention is to provide a wood holder which may be readily transported from a storage area to a wood cutting area.

A final object of this invention to be specifically enumerated herein is to provide a wood holder in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
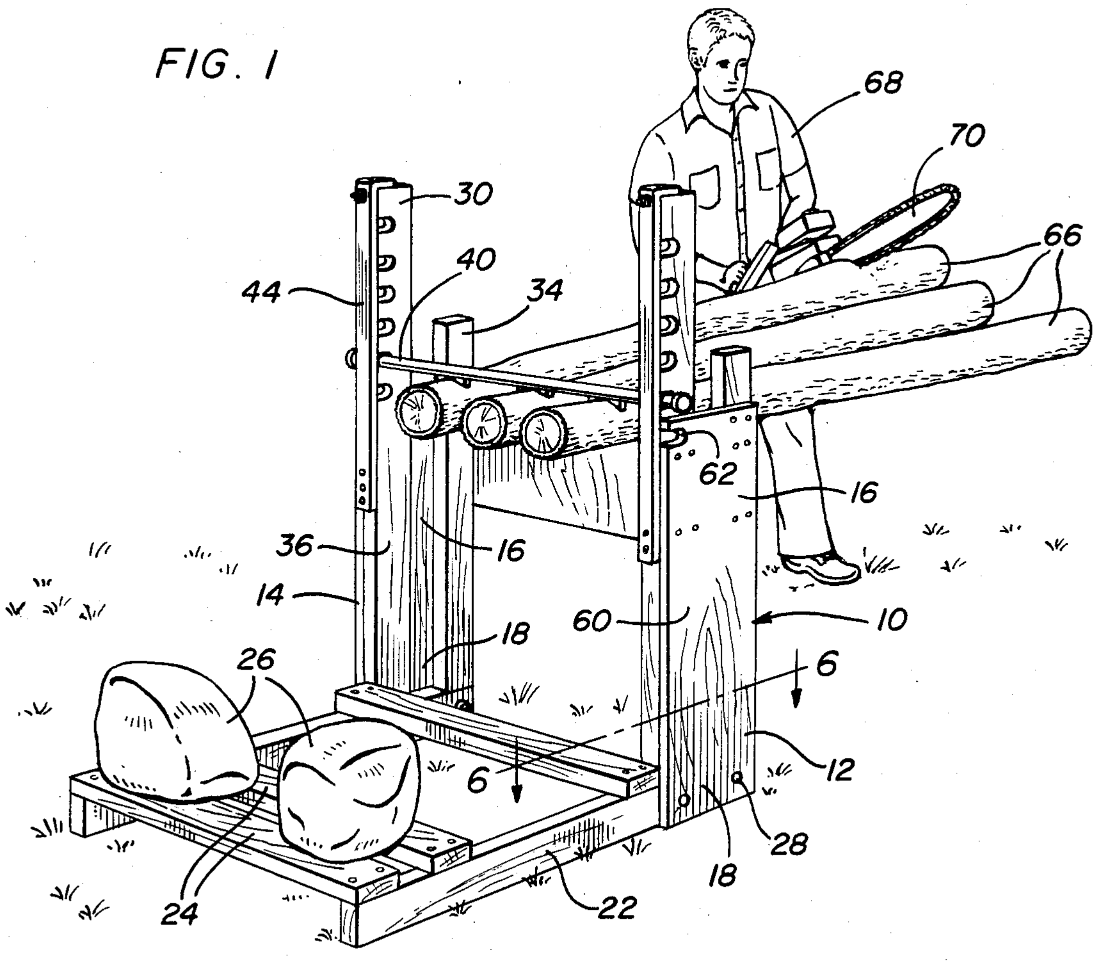
FIG. 1 is a perspective view of the wood holder in operation supporting a plurality of logs in cantilever fashion at substantially waist height while a chain saw operator performs a cutting operation on the outer end of one of the supported logs.
Figure 2:
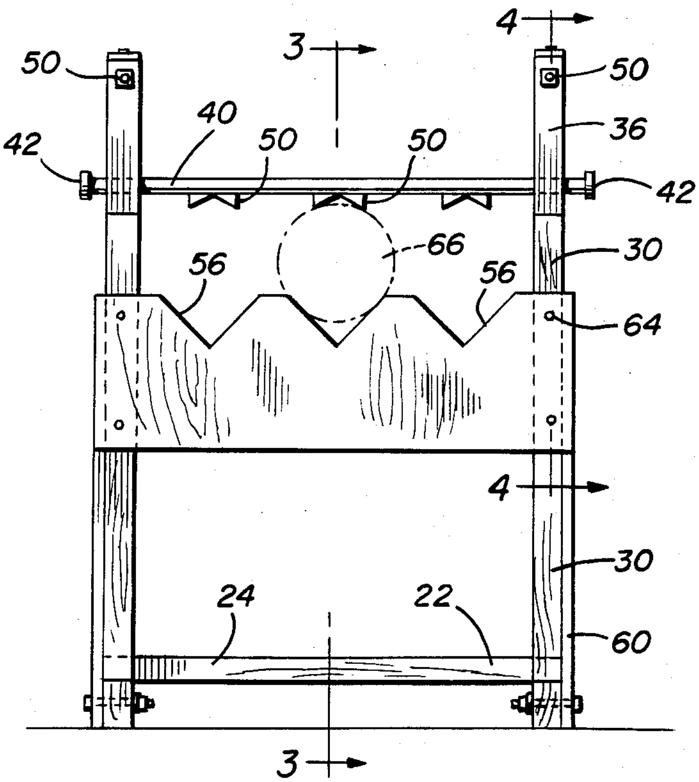
FIG. 2 is a front elevational view of the wood cutter.
Figure 6:
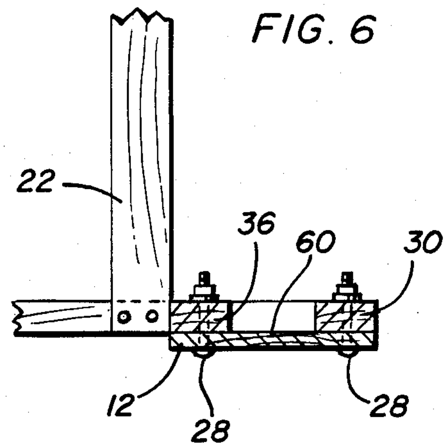
FIG. 6 is an enlarged fragmentary horizontal sectional view taken substantially upon the plane indicated by the section line 6—6 of FIG. 1.
Figure 3:
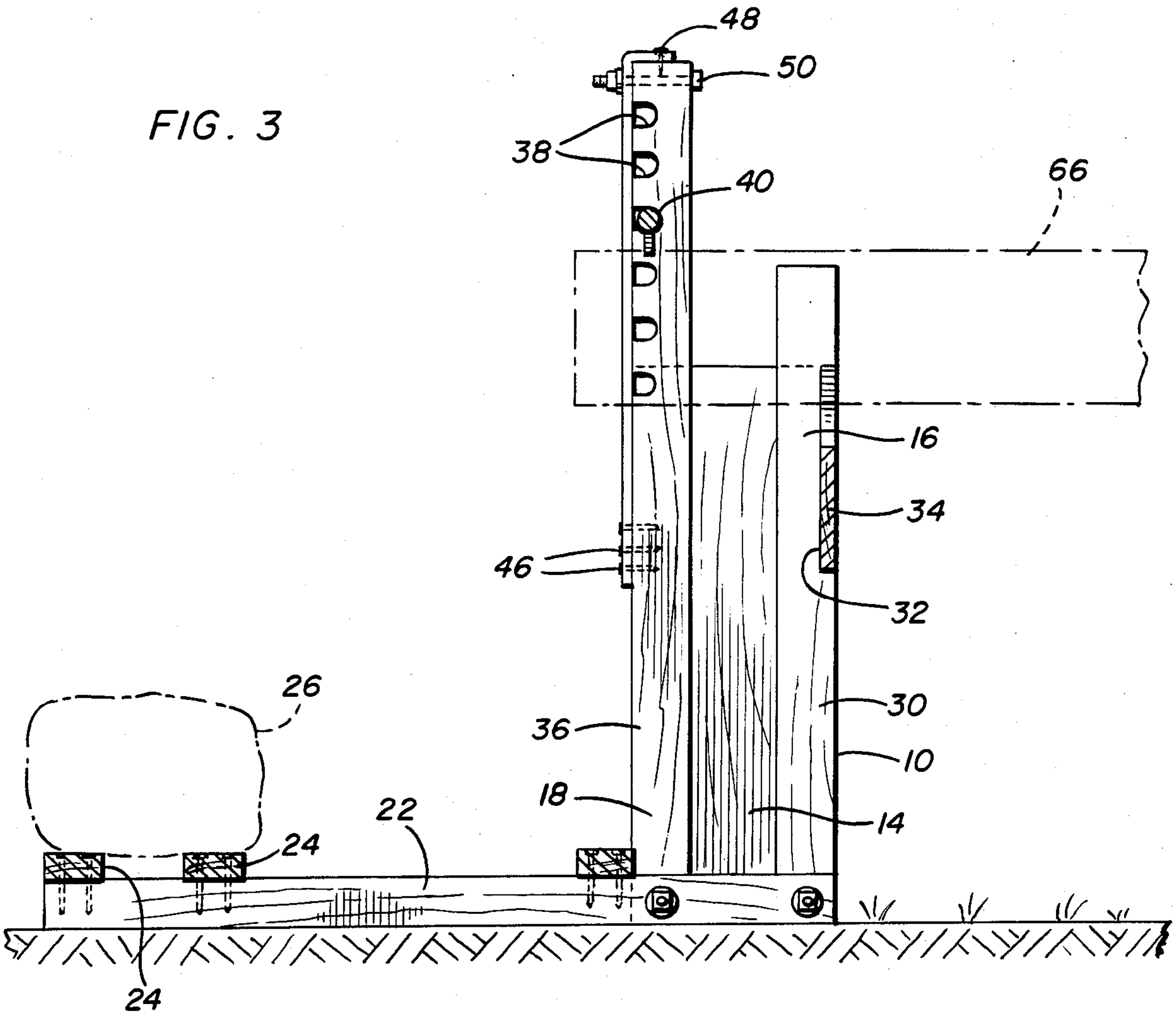
FIG. 3 is an enlarged longitudinal vertical sectional view taken substantially upon the plane indicated by the section line 3—3 of FIG. 2.

Referring now more specifically to the drawings, the numeral 10 generally disignates the wood holder of the instant invention. The wood holder 10 includes a pair of opposite side uprights 12 and 14 including upper and lower end portions 16 and 18. The lower end portions 18 of the uprights 12 and 14 are rigidly interconnected by a horizontally elongated base 22 projecting horizontally outwardly from one side, only, of an upright plane containing the uprights 12 and 14 and the outer end of the base 12 includes transverse platform defining boards 24 upon which a heavy load as represented by large rocks 26 may be placed.

The inner end of the base 22 is anchored relative to the lower end portions of the uprights 12 and 14 as at 28 and the forward portions of the uprights 12 and 14 include forward standards 30 which are notched along their forward vertical marginal edges as at 32 and support the opposite ends of a horizontal transverse fulcrum rest 34. The uprights 12 and 14 additionally include rear standards 36 including vertically spaced rearwardly opening notches 38 formed in the upper portions of their rear marginal edges. Corresponding notches 38 formed in the standards 36 are horizontally registered and a horizontal elongated abutment member 40 having diametrically enlarged heads 42 on its opposite ends extends between and is supported from the standards 36 with the opposite end portions of the abutment member 40 received in a corresponding pair of notches 38. An elongated, tensioned heavy duty elastic member 44 extends along the rear marginal edge of each standard 36 and removably closes the rear ends of the notches 38, the lower ends of the elastic members 44 being anchored relative to the standards 36 as at 46 and the upper ends of the elastic members 44 being forwardly directed over the upper ends of the standards 36 and secured thereto as at 48. In addition, a horizontal front-to-rear extending bolt is secured through the upper end of each standard 36 and the horizontally registered portion of the corresponding elastic member 44.

Figure 4:
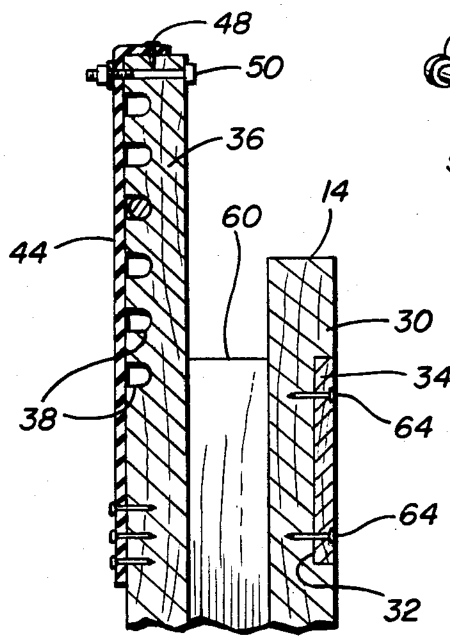
FIG. 4 is an enlarged fragmentary longitudinal vertical sectional view taken substantially upon the plane indicated by the section line 4—4 of FIG. 2.
Figure 5:
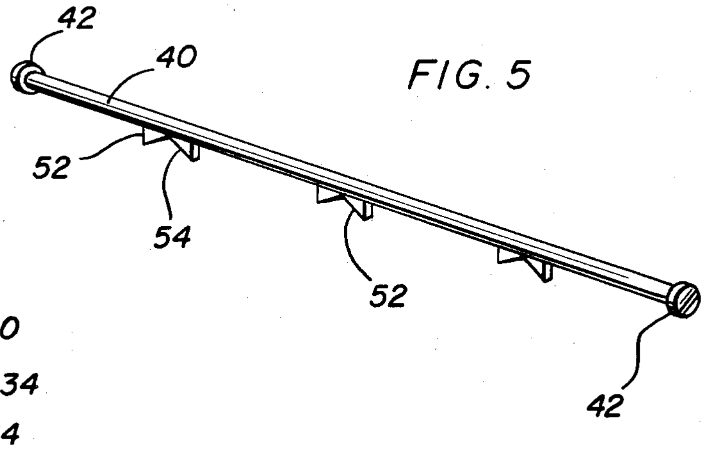
FIG. 5 is an enlarged perspective view of the horizontally elongated abutment member portion of the work holder.

The abutment member 40 includes a plurality of longitudinally spaced depending portions 50 to defining downwardly opening notches 54 and the upper marginal edge of the fulcrum rest 34 includes corresponding upwardly opening notches 56 formed therein with which the notches 54 are aligned. It will be noted that the notches 56 are spaced below the lowermost pair of notches 38 and that each pair of corresponding standards 30 and 36 is interconnected by an upstanding panel member 60 secured thereto and overlapping the outer sides of the standards 30 and 36. In addition, each of the panel members 60 includes a notch 62 formed therein, see FIG. 1, registered with the lowermost notch 38 formed in the corresponding standard 36. Also, from FIG. 4 of the drawings, it may be seen that any suitable form of fasteners 64 may used to anchor the opposite ends of the fulcum rest 34 in the notches 32 formed in the standards 30.

Other than the elastic members 44 and the various fasteners as well as the abutment member 40, the wood holder 10 may be constructed of wood. Thus, the wood holder, independent of the rocks 26, is reasonably light and may be readily lifted onto and transported to a remote log cutting location by a pickup truck or the hydraulic lift of a tractor. Once the wood holder 10 has been transported to a cutting site, the wood holder 10 is placed upon the ground and any suitable and readily available weight members such as the rocks 26 may be positioned on the outer rear end of the base 22 in the manner illustrated in FIG. 1. Then, with the height of the abutment member 40 adjusted according to the size of the logs or lumber pieces to be cut, a plurality of logs 66 may be placed in position with their rear ends beneath and projecting slightly rearward of the abutment member 40 and portions thereof spaced perhaps one foot forward of the abutment member 40 resting upon the fulcrum rest 34 and received in the notches 56. In this manner, the logs 66 are supported from the wood holder 10 with all but the rear ends of the logs 66 projecting forward of the wood holder 10. As this point, an operator 68 of a power chain saw 70 may successively cut forward end sections from the logs 66.

The ground area forward of the wood holder 10 is totally devoid of any portion of the holder 10 and may be chosen upon initial placement of the wood holder 10 upon the ground in order to provide a working area which will afford a substantially smooth, level and firm ground surface for support of the operator 68. Of course, the production of cut sections of logs may be appreciably increased if the operator 68 is accompanied by a helper for removing the cut sections of logs after each series of log sections is cut from the logs 68.

It is stressed that a power chain saw such as the saw 70 is a very efficient tool for cutting end sections from logs, but represents a reasonably dangerous piece of equipment if not handled and operated correctly. Accordingly, inasmuch as the operator 68 must support and maneuver the saw 70 and continually change his position upon the ground while cutting end sections from the logs 66, it is important that the ground surface be relatively smooth, firm and unobstructed by portions of the wood holder 10 disposed forward of the uprights 12 and 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wood holder for cantilever support of one or more elongated logs or lumber pieces in elevated horizontal position while having successive end sections cut therefrom through utilization of handheld power saw, said holder including a pair of opposite side uprights, a first horizontally elongated fulcrum rest extending between and mounted from upper portions of said uprights against downward displacement relative thereto, a horizontally elongated abutment member extending between and mounted from said upper portions of said uprights at an elevation spaced above said fulcrum rest, against upward displacement relative to said uprights and with said abutment member disposed in a first vertical plane laterally spaced from a second vertical plane containing said fulcrum rest, elongated horizontal base means interconnecting the lower end portions of said uprights, said base means projecting lengthwise considerably horizontally laterally outwardly of the first said plane in a direction away from said second plane and including an outer end portion, means anchored relative to said outer end portion for strongly resisting upward displacement of the outer end portion of said base means relative to a surface upon which said base means rests, said uprights and abutment member including means for mounting said abutment member from said uprights for vertical adjustment therealong, said abutment and fulcrum rest including downward and upward facing abutment surface portions, respectively, for abutting the upper and lower surface portions of first short end portions of elongated lumber pieces having second longer end portions thereof projecting outwardly of said second plane away from said first plane, said base means being free of portions thereof projecting appreciably outwardly of said second plane away from said first plane, said means for mounting said abutment member for vertical adjustment along said uprights including horizontally registered pairs of notches formed in said upright and opening horizontally outwardly thereof away from the side of said first plane remote from said second plane and in which the opposite ends of said abutment member are removably receivable, and elongated heavy duty tensioned elastic members secured along the sides of said uprights through which said notches open and removably closing the open ends of said notches.

2. The wood holder of claim 1 wherein said means for strongly resisting upward displacement of the outer end portion of said base means includes platform structure carried by the outer end portion of said base means and upon which heavy objects such as rocks may be placed.

3. The holder of claim 1 wherein each of said uprights includes front and rear standards, said fulcrum rest being supported from said front standards and said abutment member being supported from said rear standards.

4. The holder of claim 3 including reinforcing panel members overlying and anchored relative to the remote sides of each pair of front and rear standards.

* * * * *